United States Patent [19]
Haskell et al.

[11] Patent Number: 5,668,841
[45] Date of Patent: *Sep. 16, 1997

[54] TIMING RECOVERY FOR VARIABLE BIT-RATE VIDEO ON ASYNCHRONOUS TRANSFER MODE (ATM) NETWORKS

[75] Inventors: Barin Geoffry Haskell, Tinton Falls; Amy Ruth Reibman, East Windsor, both of N.J.

[73] Assignee: Lucent Technologies Inc., Murray Hill, N.J.

[*] Notice: The term of this patent shall not extend beyond the expiration date of Pat. No. 5,287,182.

[21] Appl. No.: 589,428

[22] Filed: Jan. 22, 1996

Related U.S. Application Data

[63] Continuation of Ser. No. 250,252, May 27, 1994, abandoned.

[51] Int. Cl.⁶ .............................. H04J 3/06; H04L 7/027; H04L 7/033
[52] U.S. Cl. ..................... 375/371; 370/516; 348/500
[58] Field of Search ........................ 375/354, 371, 375/373, 376, 357; 327/141, 144, 145, 147, 149; 370/105.3, 395, 503, 507, 508, 509, 510, 512, 516, 518; 348/500, 484

[56] References Cited

U.S. PATENT DOCUMENTS

| | | | |
|---|---|---|---|
| 4,961,188 | 10/1990 | Lau | 370/94.1 |
| 5,159,447 | 10/1992 | Haskell et al. | 358/133 |
| 5,260,978 | 11/1993 | Fleischer et al. | 375/354 |
| 5,287,182 | 2/1994 | Haskell et al. | 348/500 |

OTHER PUBLICATIONS

Vokil, F. "On Source Timing Recovery for Circuit Emulation in ATM Networks" IEEE 1989 pp. 1820–1827 vol. 3 of 3, GLOBECOM '89.

Ahmed K.M. "ATM Circuit Emulation—A Comparison of Recent Tech's" IEEE, 1991 pp. 370–374 vol. 1 of 3, GLOBECOM '91.

Lau, Fleischer "Synchronous Techniques for Timing Recovery in BISON" IEEE 1992 pp. 814–820 vol. 2 of 3, GLOBECOM '92.

Haskel, Reibman "Variable Bit Rate Video Coding for ATM & Broadcast Applics" IEEE 1993 pp. 114–116 vol. 1 of 5, ICASSP-93.

*Primary Examiner*—Wellington Chin
*Assistant Examiner*—William Luther
*Attorney, Agent, or Firm*—Thomas Stafford

[57] ABSTRACT

The problems associated with slow timing recovery in an ATM receiver are overcome by detecting the transmission rate of a received bit stream and periodically detecting the transmitted Enc_CR values, which are used to calculate additional estimated clock reference (Est_CR) values between the actual transmitted Enc_CR values. The Est_CR values are then used along with the actually received Enc_CR values to generate a phase locked loop (PLL) error signal (TC_ERROR), wherein the PLL is caused to converge more rapidly. In one embodiment, the TC_ERROR values are generated for each received cell or packet instead of only for each received Enc_CR value and, consequently, timing recovery is significantly speeded up. Additionally, the Est_CR values can be adjusted to minimize the effects of lost cells, as well as, drift in the transmission rate.

7 Claims, 5 Drawing Sheets

100

TIMING RECOVERY FOR VARIABLE BIT-RATE VIDEO ON ASYNCHRONOUS TRANSFER MODE (ATM) NETWORKS

This application is a continuation of application Ser. No. 08/250,252, filed on May 27, 1994 now abandoned.

TECHNICAL FIELD

This invention relates to digital transmission of video information and, more particularly, to timing recovery for variable bit-rate video in an ATM digital receiver.

BACKGROUND OF THE INVENTION

Networks are known which support variable bit-rate transmission by partitioning user data into a sequence of so-called "cells" and inputting them asynchronously to the network. One such network is the Broadband Integrated Services Digital Network (B-ISDN) and is referred to as an Asynchronous Transfer Mode (ATM) network.

ATM networks allow video information to be transmitted with variable bit-rate (VBR). This, in turn, allows statistical multiplexing of data from a relatively large number of users for transmission over a single data channel. The transmission of the data is in ATM cells.

In the ISO Moving Picture Experts Group (MPEG1) audio-video coding standard (ISO 11172 Committee Draft of ISO-IEC/JCT1/SC29/WG11), a system multiplexing capability is provided in which an encoder periodically sends samples of its time clock called Clock References (Enc_CRs). Typically, the Enc_CRs are transmitted at the rate of a few a second.

One arrangement for recovery of timing in an ATM decoder is disclosed in our U.S. Pat. No. 5,287,182 issued Feb. 15, 1994. In the disclosed arrangement, recovery of the time clock at the decoder relies on averaging jitter effects over many received Enc_CR values. In cases of extreme jitter, thousands of Enc_CR values may be required before the decoder timing recovery circuitry converges to a stable operating condition. Because the Enc_CR values are sent so infrequently, convergence of the decoder timing recovery circuitry can take a long time, for example, as long as 25 seconds. This would be unacceptable in most practical systems.

SUMMARY OF THE INVENTION

The problems associated with slow timing recovery in an ATM receiver are overcome by detecting the transmission rate of a received bit stream and periodically detecting the transmitted Enc_CR values, which are used to calculate additional estimated clock reference (Est_CR) values between the actual transmitted Enc_CR values. The Est_CR values are then used along with the actually received Enc_CR values to generate a phase locked loop (PLL) error signal (TC_ERROR), wherein the PLL is caused to converge more rapidly.

More specifically, in one embodiment, the TC_ERROR values are generated for each received cell or packet instead of only for each received Enc_CR value and, consequently, timing recovery is significantly speeded up.

Additionally, the Est_CR values can be adjusted to minimize the effects of lost cells, as well as, drift in the transmission rate.

DETAILED DESCRIPTION

Figure 1:
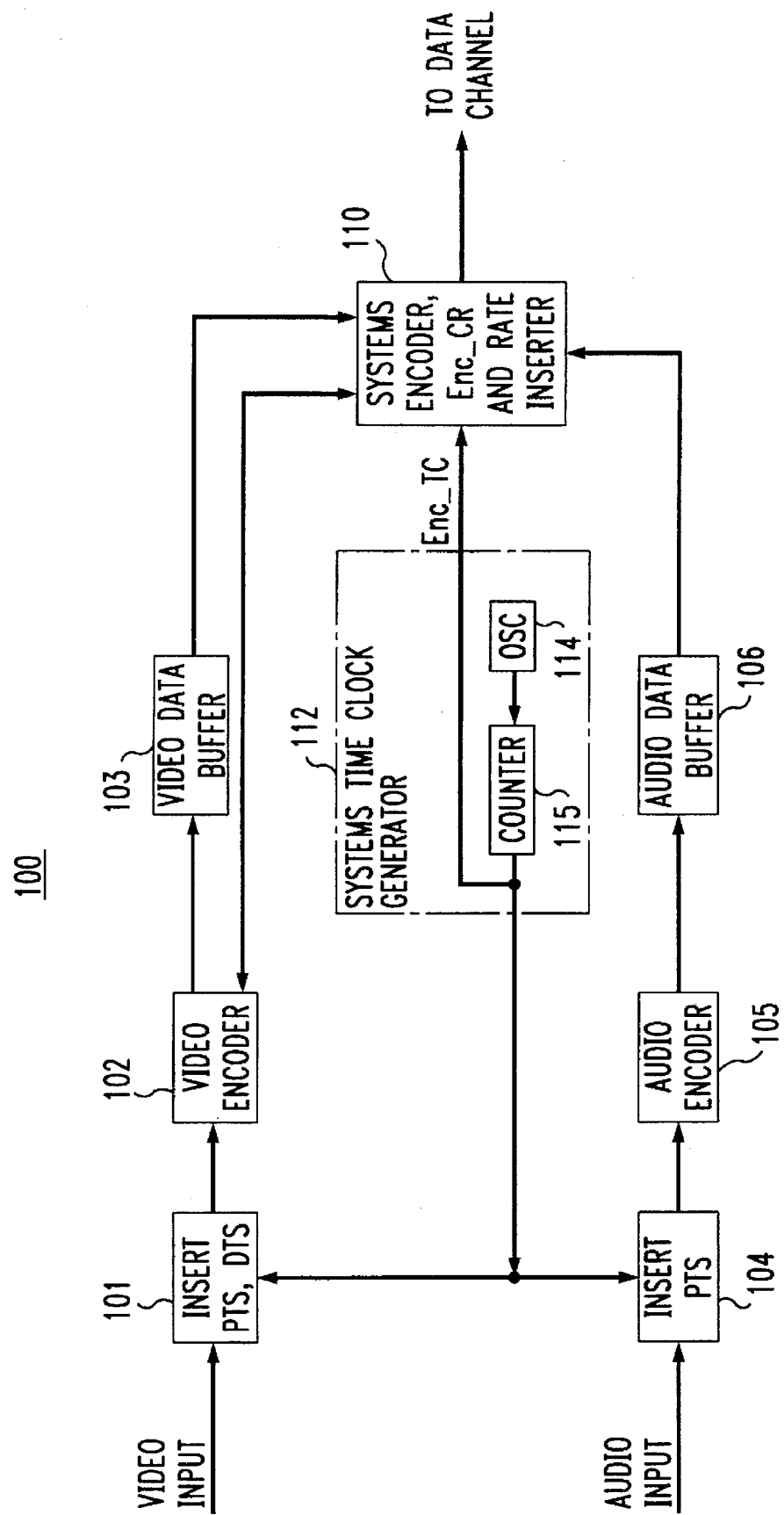
FIG. 1 shows, in simplified block diagram form, details of a multiplexer unit employed in an ATM network transmitter.
Figure 2:
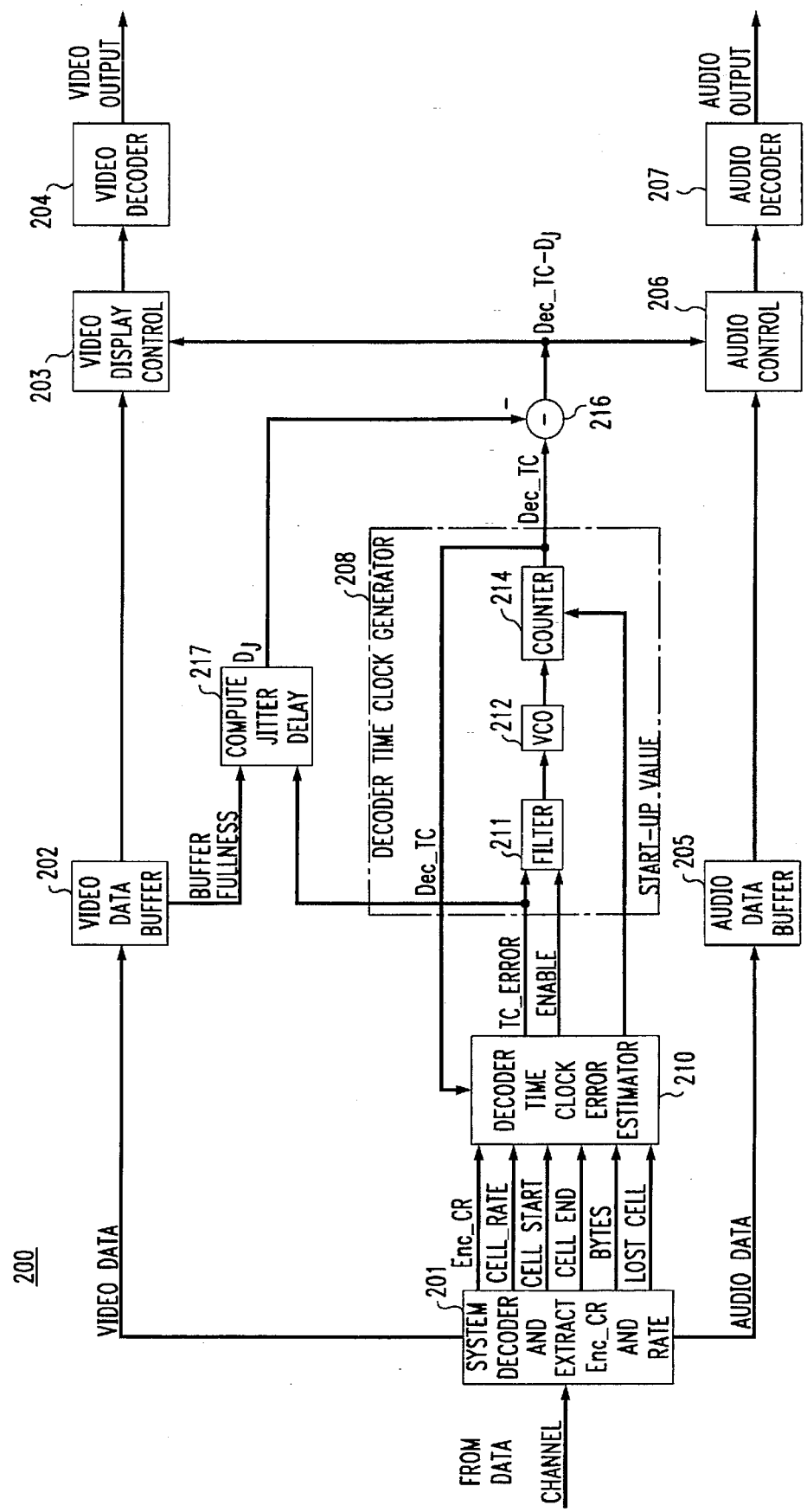
FIG. 2 shows, in simplified block diagram form, details of a demultiplexer unit employed in an ATM network receiver.

At the outset, it is noted that for brevity and clarity of exposition, only a single channel of video and its corresponding audio are illustrated in the multiplexer unit 100 of FIG. 1 and the demultiplexer unit 200 of FIG. 2. In practice, it will be apparent that a plurality of channels of video and corresponding audio will be employed to be multiplexed for transmission in multiplexer unit 100 and a similar plurality of channels of video and corresponding audio will be obtained via demultiplexer 200.

Specifically, multiplexer unit 100, shown in FIG. 1 in simplified form, includes in the video channel insert PTS, DTS unit 101, video encoder 102 and video data buffer 103. The audio channel includes insert PTS unit 104, audio encoder 105 and audio data buffer 106. Data from video data buffer 103 and audio data buffer 106 are supplied to systems encoder, Enc_CR and Rate inserter 110. Systems time clock generator 112 includes oscillator 114 and output counter 115. The output of counter 115 is the system encoder time clock value Enc_TC which is supplied to insert PTS, DTS unit 101, insert PTS unit 104 and systems encoder, Enc_CR and Rate inserter 110. It is noted that according to the MPEG1 specifications, the frequency for oscillator 114 shall be 90 kHz±50 ppm. Additionally, the frequency drift of oscillator 114 shall not exceed 250 microhertz/second. In this embodiment, counter 115 supplies a 33-bit Enc_TC value as an output that is incremented once for each pulse supplied from oscillator 114.

The video input data is first supplied to insert PTS, DTS unit 101 which inserts Presentation Time Stamps (PTS) on some or all of the image representations, i.e., picture frames. If a PTS is inserted on a non-Bidirectionally Predicted Image Representation (non-B-picture), then a Decoding Time Stamp (DTS) must also be inserted. For these image representations, PTS exceeds DTS (in picture periods) by one plus the number of bidirectional image representations to be encoded. The resulting "time stamped" video data then passes to video encoder 102 where it is encoded in known fashion. In turn, the encoded video data is supplied to video data buffer 103 to await transmission via systems encoder, Enc_CR and Rate inserter 110.

The input audio is in the form of so-called Audio Access Units (AAU), which are supplied to insert PTS unit 104 where PTS values are inserted on some or all of the AAUs. Thereafter, the AAUs are supplied to audio encoder 105 where they are digitally encoded in well-known fashion and, thereafter, supplied to audio data buffer 106 to await transmission via systems encoder, Enc_CR and Rate inserter 110.

The PTS/DTSs are employed to control the decoding and displaying of the audio and video data in demultiplexer unit 200 (FIG. 2). The decoding and displaying in response to the PTS/DTSs are such as to maintain synchronism and to avoid overflow and underflow of data buffers in demultiplexer unit 200. Typically, the PTS/DTS values inserted by units 101 and 104 are equal to some constant value plus the instantaneous Enc_TC values from systems clock generator 112.

Systems encoder, Enc_CR and Rate inserter 110 forms packs and packets of data and supplies them asynchronously to a data communications channel. Packs include packets from a plurality of video and audio encoders (not shown). Pack headers also contain Enc_CR values that are the instantaneous values of Enc_TC from systems time clock generator 112. According to MPEG specifications, packs must be transmitted at least every 0.7 seconds. As noted above, the Enc_CR values are sent in packs and, thus, only a few Enc-CR values are sent every second. Additionally, the MPEG specifications assume that the channel data rate is constant for the duration of the pack.

The packets in a pack contain video or audio data with the PTS/DTS values, if any, moved to the packet header. Hence, for situations of more than one PTS/DTS per packet, all except the first are discarded.

$R_i$ is a representation of the number of bits being transmitted to the data channel during the coding of image representation (picture) i. For a current image representation being transmitted, systems encoder, Enc_CR and Rate inserter 110 supplies to video encoder 102 the actual number of bits being transmitted. For future image representations, video encoder 102 supplies to systems encoder, Enc_CR and Rate inserter 110 suggested values for the number of bits to be transmitted for each image representation. Systems encoder, Enc_CR and Rate inserter 110 then chooses the actual values according to prescribed principles which are known (see, for example, our U.S. Pat. No. 5,159,447 issued Oct. 27, 1992 and our article entitled "Constraints on Variable Bit-Rate Video for ATM Networks", Document #AVC-56, CCITT STUDY GROUP XV WP XV/1, Experts Group for ATM Video Coding, May 21, 1991).

FIG. 2 shows, in simplified block diagram form, details of demultiplexer unit 200. Specifically, shown are system decoder and Extract Enc_CR and Rate unit 201, which supplies video information to be decoded to video data buffer 202 where it is stored awaiting display. Video data from buffer 202 is supplied to video display control 203 and, eventually, to video decoder 204. Similarly, audio data is supplied from systems decoder and extract Enc_CR and Rate unit 201 to audio data buffer 205 where it is stored awaiting display. Audio data from buffer 205 is supplied to audio display control 206 and, eventually, to audio decoder 207. System decoder and Extract Enc_CR and Rate unit 201 also detects the received system clock reference (Enc_CR) values, the received cell rate, a cell start indication, a cell end indication, the number of bytes and a lost cell indication and passes them to decoder time clock error estimator 210. Note that the transmission rate is denoted as Cell_Rate. The incoming bit stream may contain other representations of data rate, e.g., bytes per second. In such an instance, system decoder and extract Enc_CR and Rate unit 201 converts that other representation to cells per second. Additionally, the time between transmitted cells is defined as follows, Cell_period=1/Cell_Rate. Note that at the receiver, the time between received cells will usually vary because of delay jitter. The instants of cell start and cell end are defined as the exact times just after the first and last payload bytes of the cell are received, respectively.

Decoder time clock error estimator 210 operates as described below to generate a time clock error signal, denoted TC_ERROR, for each cell and passes it to decoder clock generator 208 along with an enable signal which indicates when there is a valid TC_ERROR value being received and a start up value. As indicated above, since a TC_ERROR value is generated for each cell instead of only for each received Enc_CR value, timing recovery is significantly speeded up.

Figure 3:
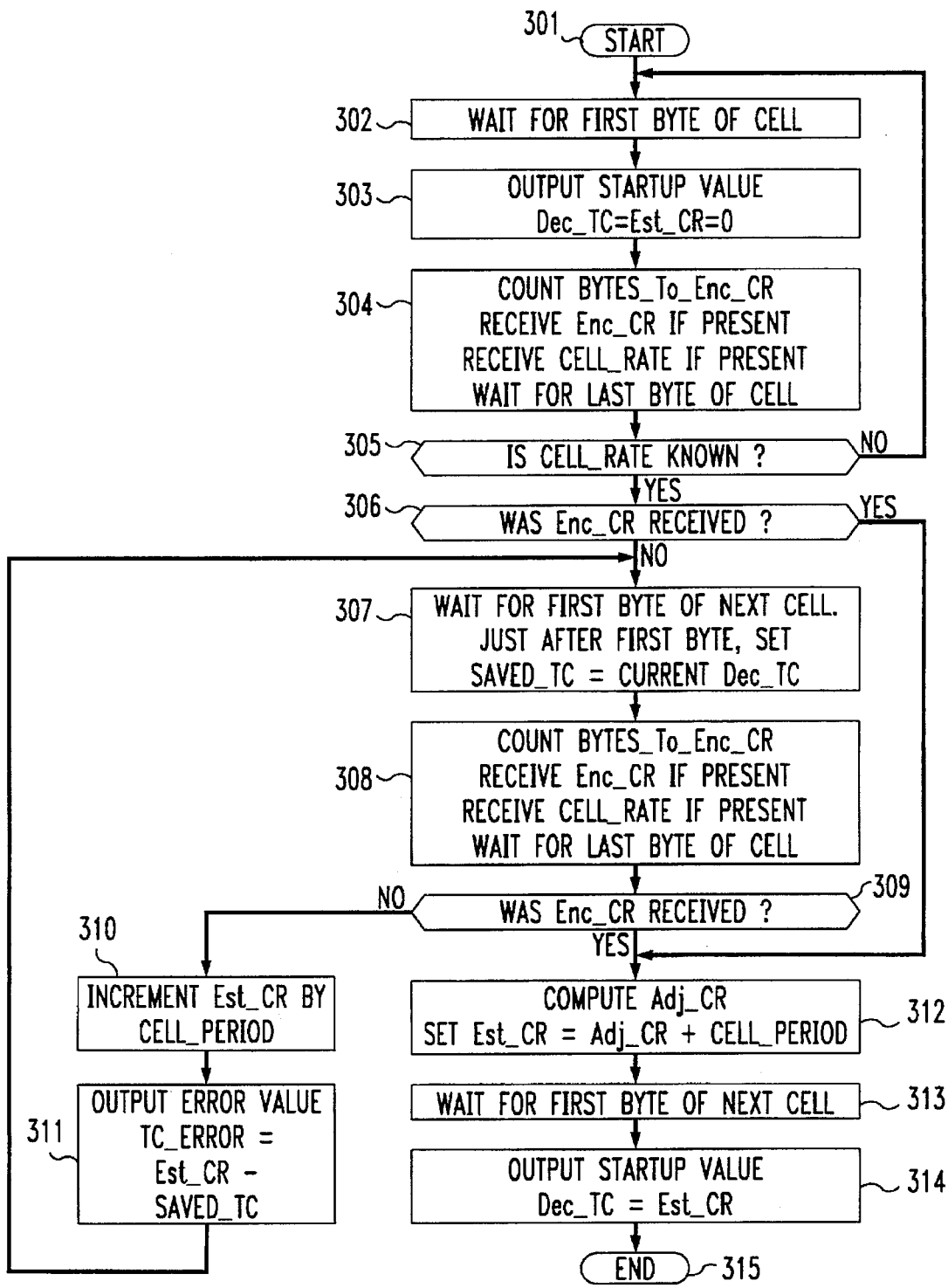
FIG. 3 is a flow chart illustrating the startup operation of the decoder time clock error estimator of FIG. 2.

The startup procedure for decoder time clock estimator 210 is illustrated in the flow chart of FIG. 3. The procedure is started via step 301. Thereafter, step 302 waits for the first byte of a received cell. Upon arrival of the first cell, step 302 causes the startup value Dec_TC=0 to be supplied as an output, and sets the estimated clock reference for this cell to be Est_CR=0. Step 304 causes a count of the received bytes to begin. If an Enc_CR value is received, the number of bytes from the beginning of the of the cell up to and including the last byte of the Enc_CR is saved as Bytes_To_Enc_CR. If Cell_rate is received, it supersedes any default value in existence. It is assumed,in this example,that if Enc_CR and Cell_rate are both present, they appear in the same cell. In certain arrangements this may not necessarily be the case. In such an instance, a solution is to disable the output of a TC_ERROR value until a new Enc_CR value is received in the same cell as a Cell_rate value. Then, step 304 awaits the end of the cell. Thereafter, step 305 tests to determine if the Cell_rate is known either from a received value or a default value. If the result in step 305 is NO, control is returned to step 302 and steps 302 through 305 are iterated until step 305 yields a YES result. Then, step 306 tests to determine if an Enc_CR value was received. If the test result in step 306 is NO, step 307 waits for the first byte of the next cell to be received. Upon its arrival, the current value of the decoder time clock (Dec_TC) output from decoder time clock generator 208 is saved in the parameter Saved_TC. Then any possible.Enc_CR or Cell_rate values are received by invoking step 308, which is identical to step 304 described above. Step 308 also waits for the last byte of the cell and upon its arrival step 309 tests to determine whether an Enc_RC was received. If the test result in step 309 is YES, control is passed to step 312. If the test result in step 309 is NO, step 310 causes the timing recovery phase locked loop, formed by decoder time clock generator 208 and decoder time clock error estimator 210, to begin to track based on the Cell_rate value alone. This is accomplished by incrementing Est_CR by the Cell_period so that it corresponds to the beginning of the current cell. Then, step 311 outputs an estimated start-of-cell decoder time clock error value given by TC_ERROR=Est_CR- Saved_TC. An enable signal is also generated to indicate to filter 211 that the TC_ERROR value is valid. Thereafter, control is returned to step 307 and steps 307 through 311 are iterated until step 309 yields a YES result indicating that an Enc_CR value has been received. Returning to step 306, if the test result is YES, an Enc_CR value has been received and control is passed to step 312. It is assumed that Enc_CR represents the time just after the last byte of Enc_CR is transmitted, assuming a constant transmission bit rate. However, the transmission bit rate is not instantaneously constant with ATM. Instead, cells are sent in bursts at a generally much higher than the average encoder 100 output bit rate, which distorts the timing of the Enc_CRs. This distortion could be avoided by employing a FIFO to store the received cells and then read them out at a constant rate. This, however, would require an increased cost and would have problems if the bit rate were to change during transmission.

This distortion is avoided in this embodiment by computing in step 312 an adjusted Enc_CR value which is denoted by Adj_CR and is calculated by Adj_CR=Enc_CR-(Bytes_To_Enc_CR-1)*Cell_period/Bytes_In_Cell. Then, step 312 calculates an estimated clock reference value Est_CR for the next cell by Est_Cr=Adj_CR+Cell_period. Thereafter, step 313 waits for the first byte of the next cell. Then, step 314 outputs a startup value Dec_TC=Est_CR and causes an enable signal to be supplied as an output. Thereafter, the routine is ended in step 315.

It is noted that some implementations will not adhere to all of the assumptions made above in the flow chart of FIG. 3. For example, in MPEG2 multiplexed bit streams the Enc_CR (called PCR or SCR) represents the time that the next to last byte of Enc_CR is transmitted. Thus, for this case, the calculation of Adj_CR in step 312 becomes Adj_CR=Enc_CR-(Bytes_To_Enc_CR-2)*Cell_period/Bytes_In_Cell.

Figure 4:
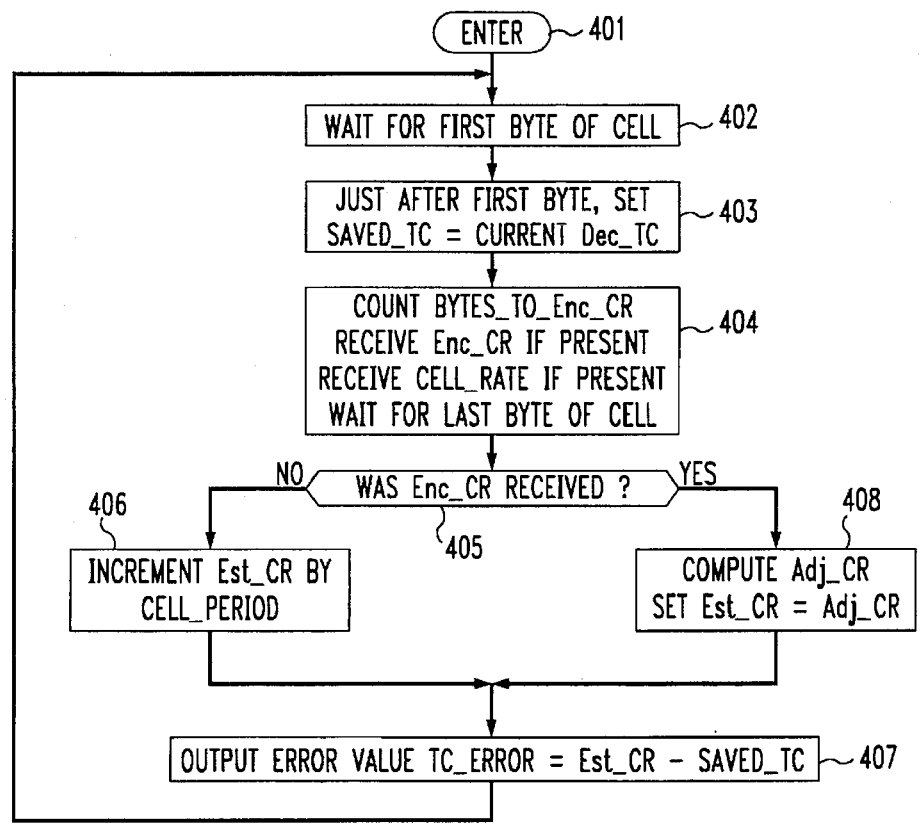
FIG. 4 is a flow chart illustrating the steady state operation of the decoder time clock error estimator of FIG. 2.

FIG. 4 is a flow chart illustrating the steady state operation of decoder time clock error estimator 210. The routine is entered via step 401. Then, step 402 waits for the start of the next cell, after which step 403 saves the current value of Dec_TC in parameter Saved_TC. Then, any possible Enc_CR or Cell_Rate values are received by invoking step 404 (which is identical to step 304 described above). Step 404 also waits for the last byte of the cell and, upon its arrival, step 405 tests to determine if an Enc_CR has been received. If the test result in step 405 is NO, step 406 increments the Est_CR by the Cell_period so it corresponds to the beginning of the current cell. If the test result in step 405 is YES, an Enc_CR was received. Then, step 408 causes an Adj_CR value to be computed in the same manner as step 312 (FIG. 3) described above and then sets Est_CR=Adj_CR. Following either step 406 or step 408, step 407 outputs the estimated start-of-cell decoder time clock error given by TC_ERROR=Est_CR-Saved_TC. An enable signal is also outputted to indicated to filter 211 that the TC_ERROR value is valid. Thereafter, control is returned to step 402 and the routine is continued.

Note that the generation of the TC_ERROR value in decoder time clock error estimator 210 is performing the phase comparison operation in the decoder phase locked loop.

The above operations of decoder time clock error estimator 210 as illustrated in the flow charts of FIGS. 3 and 4 assume that no cells have been lost. In practice, there will be detectable cell losses and in such cases simple modifications of the operations of the flow charts of FIGS. 3 and 4 can minimize the effects. If, for example, cell losses are detectable in the cell header then the value of Est_CR in steps 307 and 313 of FIG. 3 and in step 408 in FIG. 4 should be incremented by the Cell_period for each lost cell in order to maintain a correct timing estimate.

Additionally, it has also been assumed that Enc_CR and Cell_rate occur in the same cell. However, with MPEG2 program streams and all MPEG1 streams this may not be the case. One solution is to disable outputting of TC_ERROR if Enc_CR and Cell_rate are received in different cells and not resume outputting TC_ERROR until a new Enc_CR with known Cell_rate is received.

Again, the operations described in the flow charts of FIGS. 3 and 4 assume the transmission rate, i.e., the Cell_period, is known exactly. This is often the case. The Cell_period is often an exact integral number of the encoder time clock "ticks". For example, in MPEG2 the nominal time clock frequency is 27 MHz. With a transmission rate of 4 Mbs and Bytes_In_Cell=47 the number of encoder time clock ticks per cell is given by Nc=27 Mhz*8 bits/byte*47 bytes/cell/4 Mbs=2538 ticks/cell. In general, if TR is the transmission rate in bits/second, Nc=216×10$^6$*Bytes_In_Cell/TR (rounded to integer, 0.5=1). If the transmission rate is locked to the encoder time clock, i.e., a cell is sent every Nc ticks, then timing recovery takes place with an effective known transmission rate.

Decoder time clock generator 208 is a portion of a phase locked loop including filter 211, voltage controlled oscillator (VCO) 212 and output counter 214. Note as described above, the PLL phase comparison is done in decoder time clock error estimator 210 in order to generate TC_ERROR values. To this end, the Dec_TC output from decoder time clock generator 208 is supplied to decoder time clock error estimator 210. The enable signal from systems decoder and extract Enc_CR and Rate unit 201 is supplied to enable filter 211 when a valid TC_ERROR value is available. The start up value is supplied to set counter 214 to the value of the initial Enc_TC value being received after it has been adjusted, as described above so that the initial audio or video data in the packets of the initial received pack may properly be displayed. Filter 211 smooths the error TC_ERROR values and generates a control voltage which is used to control the frequency of VCO 212.

In the absence of transmission jitter delay, and assuming that the center frequency of VCO 212 is close to that of the oscillator 114 in multiplexer unit 100 (FIG. 1), the control signal output of filter 212 will eventually stabilize to a small, nearly constant value. If the frequency of oscillator 114 (FIG. 1) drifts slightly upward, then the Enc_CR output values will increase slightly, producing a corresponding increase in the control voltage being supplied to VCO 212 which, in turn, increases its frequency. This, in turn, causes the Dec_TC values being supplied as an output from systems time clock generator 208 to increase slightly, thus tracking the values of the received Enc_CR values, as well as, the generated estimated EST_CR values. Similarly, for a decrease in frequency of oscillator 114, the Enc_CR (Est_CR) and Dec_TC values in demultiplexer unit 200 track each other by also decreasing.

The amount of smoothing provided by filter 211, i.e., the time duration over which averaging occurs of the TC_ERROR difference signal, determines how fast VCO 212 can respond. A small amount of smoothing by filter 211 can cause a rapid alignment of Enc_CR (Est_CR) and Dec_TC values. However, if audio and video clocks were also derived from VCO 212, such a rapid alignment could be detrimental to the audio and video quality. In such an instance, significantly more smoothing by filter 211 may be necessary.

The gain of filter 211, or equivalently the input sensitivity of VCO 212, also has an effect on the frequency stability of the output pulses being supplied to counter 214. If the gain is large, then a small difference between the Enc_CR (Est_CR and Dec_TC values) will cause a large frequency shift in the output of VCO 212. If the gain is too large, then VCO 212 may never stabilize. If the gain is too small, stable operation could occur even if the Enc_CR (Est_CR) and Dec_TC values were not close to each other.

The audio and video decoder timing is controlled via Presentation/Decede Time Stamps (PTS/DTS) that are, as indicated above, included in the respective audio or video data. Assuming PTSs occur on every image representation, the DTS (PTS, if no DTS) of the oldest image representation stored in video data buffer 202 passes to video display control 203. Video display control 203 waits until the Dec_TC-$D_j$ value increases to the value of the oldest DTS. It then extracts the ceded video data for the corresponding image representation from video data buffer 202 and passes it to video decoder 204 for decoding. For each video image representation input to decoder 204, an image representation is supplied as the video output for display. The video output may be the same image representation as the input (e.g., for B-pictures), or it may be a stored previously decoded picture (e.g., for non-B-pictures).

If an image representation does not have a DTS, then video display control 203 computes an extrapolated DTS value by simply adding the nominal picture duration to the DTS of the previous image representation. It is assumed that video decoder 204 always completes decoding each image representation before the next image representation is due to be decoded.

When the oldest received (or extrapolated) audio PTS equals Dec_TC-$D_j$, then a next audio access unit in audio data buffer 205 is supplied via audio display control 206 to audio decoder 207. The decoded audio is immediately passed as the audio output corresponding to the video output to be displayed.

Figure 5:
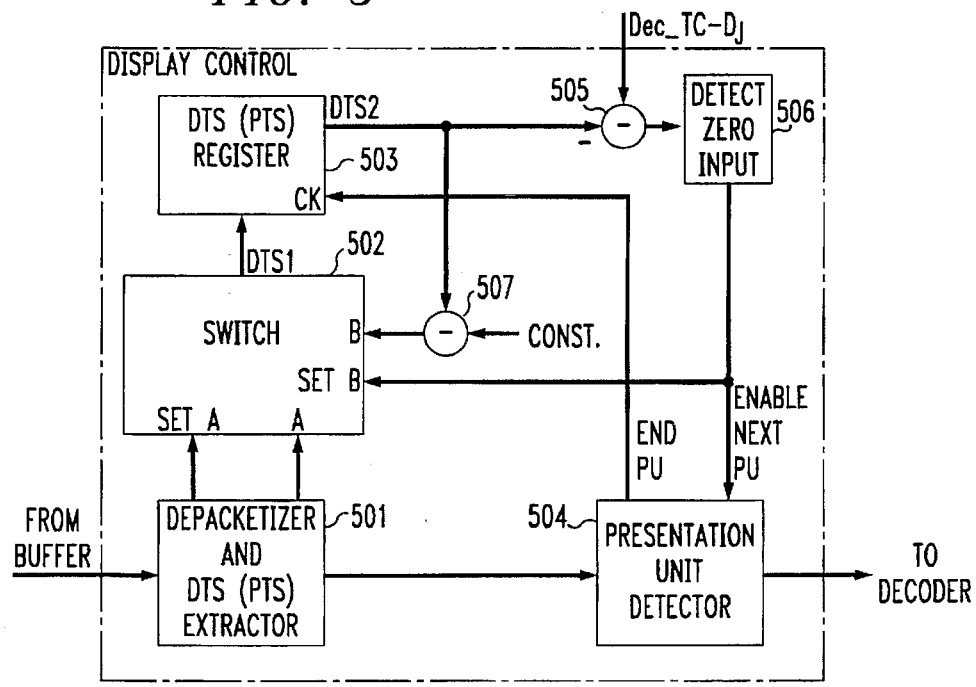
FIG. 5 shows, in simplified block diagram form, details of the display controls employed in the demultiplexer unit of FIG. 2.

Details of the video and audio display controls are shown in FIG. 5 and described below.

If there is substantial transmission jitter delay, then demultiplexer 200 may not operate correctly. This results because filter 211 of systems time clock generator 208 must average over a much longer time interval than in a jitter free situation. However, even if this is the case, a more serious arrival times may be considerably different than was assumed in multiplexer 100 (FIG. 1). When such an occurrence happens, there is a possibility of overflow or underflow of the video and/or audio data buffers in demultiplexer 200.

Overflow of the data buffers can be readily avoided by increasing the buffer sizes beyond what was assumed by the encoder in multiplexer 100. Underflow of the data buffers can be alleviated by the addition of a jitter delay $D_j$, which causes an extra accumulation of data in the data buffers prior to decoding. The additional stored data provides insurance against underflow. In fact, if bounds on jitter delay can be guaranteed, the possibility of underflow of the data buffers can be substantially eliminated by choosing sufficiently large buffers and a sufficiently large value for $D_j$. This value of jitter delay $D_j$ is then algebraically combined in subtractor 216 with Dec_TC to form Dec_TC-$D_j$. The amount of the delay for MPEG1 is given by $D_j/90000$ seconds. Then, the Dec_TC-$D_j$ value is supplied to be utilized in video display control 203 and audio display control 206 as described below.

Dynamic tracking of jitter delay for the channel is realized by employing compute jitter delay unit 217 which dynamically generates jitter delay value $D_j$. The resulting dynamically obtained value of $D_j$ is supplied to a negative input of subtractor 216 to obtain the value Dec_TC-$D_j$. To substantially eliminate data buffer underflow, it is only necessary to insure that $D_j$ is sufficiently large. Data buffer underflow may occur if data is late in arriving, i.e., Dec_TC>Enc_CR(Est_CR). Thus, a conservative choice of $D_j$ is the largest measured value of Dec_TC-Enc_CR(Est_CR). In actual operation, $D_j$ is very slowly increased to the desired value without much effect on audio and video quality.

The instantaneous fullness of video data buffer 202 is used to modulate the value of jitter delay $D_j$. To this end, the fullness value of video data buffer 202 is supplied to compute jitter delay unit 217 along with the TC_ERROR value output from decoder time clock error estimator 210.

Figure 6:
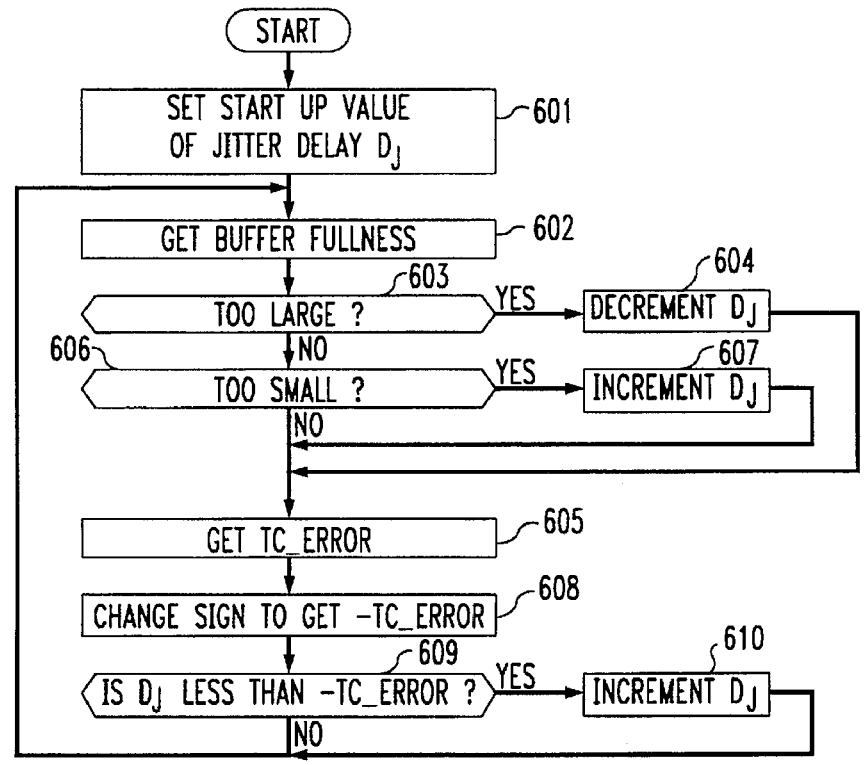
FIG. 6 is a flow chart illustrating the process of generating jitter-delay values in the compute jitter-delay unit of FIG. 2.

The compute jitter delay process is illustrated in the flow chart of FIG. 6. Specifically, at start of the process step 601 initializes the $D_j$ value to a nominal expected jitter delay value. Step 602 then reads the fullness of video data buffer 202. Step 603 tests to determine if the fullness value of video data buffer 202 is too large, indicating too much jitter delay. If the test result in step 603 is YES, step 604 causes the value of $D_j$ to be decremented. Thereafter, control is passed to step 605. If the test result in step 603 is NO, step 606 tests to determine if the fullness of video data buffer 202 is too small. If the test result in step 606 is YES, step 607 causes the value of $D_j$ to be incremented. Thereafter, control is passed to step 605. If the test result in step 606 is NO, step 605 reads the value of TC_ERROR from phase decoder time clock error estimator 210. Step 608 causes the sign of the value obtained in step 605 to be changed to obtain a -TC_ERROR value. Then, step 609 tests to determine if the value of $D_j$ is less than the value of -TC_ERROR. If the test result in step 609 is YES, step 610 increments the value of $D_j$. If the test result in step 609 is NO, control is returned to step 602.

The amount of the increments and decrements in the process of FIG. 6 depend on how fast an adaptation process is desired and upon how much stability is required in the audio and video outputs. Such determinations are left to be chosen by the implementor of the system.

FIG. 5 shows, in simplified block diagram form, details of a display control unit which may be employed for either video display control 203 or audio display control 206. It is noted that for audio display control 206 only PTS values are employed. Specifically shown is depacketizer and DTS (PTS) extractor 501 which strips off packet headers and detects the presence of DTS and/or PTS. (The first packet received is required to contain a PTS.) If PTS/DTS is detected (set DTS=PTS if no DTS), then switch 502 is set to the A position via a signal from depacketizer and DTS (PTS) extractor 501, and the DTS value is supplied to the A input of switch 502. In turn, the supplied DTS value is supplied as an output by switch 502 as DTS1 to DTS (PTS) register 503.

After stripping off packet headers, depacketizer and DTS (PTS) extractor 501 passes the remaining packet data upon request to presentation unit (PU) detector 504. For video display control 203, a PU is an image representation (i.e., picture). For audio display control 206, a PU is an Audio Access Unit (AAU). At the start of every first PU (and no others), presentation unit detector 504 outputs a clock pulse that clocks DTS (PTS) register 503, thus causing its input DTS1 to be read, stored and then supplied as an output as DTS2 to subtractor 505 and adder 507. Then, presentation unit detector 504 waits.

Dec_TC-$D_j$ values are supplied to subtractor 505, where they are compared with the stored DTS2 values. The resulting difference Dec_TC-$D_j$-DTS2 is supplied to zero detector 506. When Dec_TC-$D_j$ increases to a value equal to DTS2, enable next PU signal is supplied as an output to presentation unit detector 504 and the set B input to switch 502. This allows the next PU to be passed to the decoder. For video display control 203, upon receiving this enable next PU signal, presentation unit detector 504 transfers the data for the next PU to video decoder 204. Similarly, for audio display control 206, the enable next PU signal, causes presentation unit detector 504 to transfer the data for the next PU to audio decoder 207. As indicated, the enable next PU signal also causes switch 502 to be set to the B position. If during the output of the PU depacketizer and DTS (PTS) extractor 501 detects a PTS/DTS, it sets switch 502 to the A position as before. However, if no PTS/DTS is detected, switch 502 remains in the B position.

At the end of a PU data transfer by presentation unit detector 504, it outputs a clock pulse to the clock input of DTS (PTS) register 503, as before. If a new DTS value has arrived, it is mad, as before, from the A input of switch 502 and supplied as a DTS1 value to register 503 and appears as a DTS output value from register 503. However, if no new DTS value has arrived, then switch 502 still remains in the B position. In this situation, an extrapolated DTS value is supplied from adder 507 and is supplied as a new DTS1 value to register 503 and appears at an output thereof as DTS2. This extrapolated DTS value is obtained by adding via adder 507 a constant nominal picture duration value in units of Dec_TC to the previous DTS2 value. For example, if the nominal picture frequency is 29.97 Hz and the Dec_TC frequency is 90 kHz, then the constant is 3003.

Presentation unit detector 504 then waits until Dec_TC-$D_j$ increases to this new value of DTS2, whereupon it receives an enable next PU signal (pulse) from zero detector 506, thus repeating the data output cycle.

In critical, high quality applications requiring a very stable video timing, the stability of systems time clock generator 208 may not be sufficient to acquire the desired quality level. For example, MPEG 1 specifications call for the Dec_TC stability of ±50 ppm while the industry standard for the transmission video clock stability is ±3 ppm. Consequently an arrangement of enhancing the video timing and demultiplexer unit 200 is needed.

Figure 7:
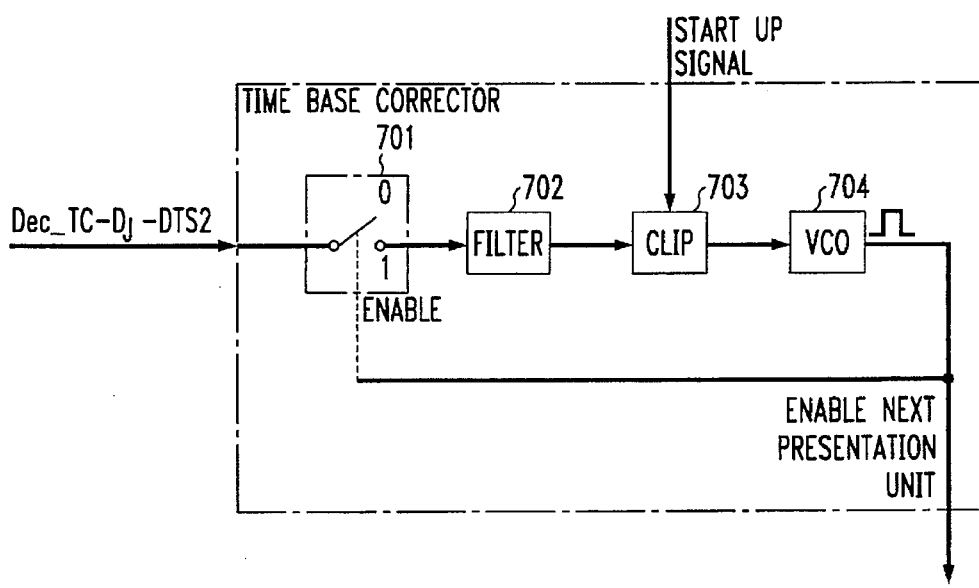
FIG. 7 shows, in simplified block diagram form, details of a time base corrector employed in the display control to enhance the stability of video timing.

To this end, FIG. 7 shows in simplified block diagram form, a time base correction circuit that can be employed in place of zero detector 506 in FIG. 5. As indicated above, the enable next PU signals (pulses) from VCO 704 are also employed to enable switch 701. Each such enable next PU signal causes switch 701 to close, thereby allowing the instantaneous timing error signal input to be supplied to filter 702. Filter 702 averages the sampled timing error signals, typically over some time window, and passes the results to clipper 703. Judicious choices of filter duration and gain determine the stability and tracking rate of the phase locked loop of the time base corrector shown in FIG. 7.

The above-described arrangements are, of course, merely illustrative of the applications of the principles of the invention. Other arrangements may be devised by those skilled in the art without departing with the spirit and scope of the invention.

We claim:

1. Apparatus for use in an asynchronous transfer mode (ATM) transmission network for recovering timing in a receiver comprising:

means for receiving an asynchronous digital signal including system clock reference values and transmission rate values;

means for extracting said system clock reference values and said transmission rate values from the received asynchronous digital signal;

means supplied with said extracted system clock reference values and extracted transmission rate values for generating estimated clock reference values between the times indicated by said extracted system clock reference values; and means for utilizing said extracted system clock reference values and estimated clock reference values for generating a system time clock at the receiver.

2. The apparatus as defined in claim 1 wherein said means for utilizing includes a phase locked loop having an input and an output wherein said extracted system clock reference values and estimated clock reference values are supplied to said input and said system time clock is generated at said output, such that said phase locked loop in response to said extracted system clock reference values, estimated clock reference values, and system time clock converges more rapidly than 25 seconds.

3. The apparatus as defined in claim 1 wherein said means for generating estimated clock reference values includes means for adjusting the values of the extracted system clock reference values and the generated estimated clock reference values to be a value representative of the time that a corresponding cell was supplied as an output from a remote encoder.

4. The apparatus as defined in claim 3 wherein said means for generating estimated clock reference values further includes means for generating an estimated clock reference value for each received cell in the asynchronous digital signal between the extracted system clock reference values.

5. The apparatus as defined in claim 4 wherein said means for utilizing includes means responsive to said system time clock, said extracted system clock reference values and said estimated clock reference values for generating an error signal representative of the difference between said extracted system time clock and said estimated clock reference values.

6. Apparatus for use in an asynchronous transfer mode (ATM) transmission network for recovering timing in a receiver comprising:

means for receiving an asynchronous digital signal including system clock reference values and transmission rate values;

means for extracting said system clock reference values and said transmission rate values from the received asynchronous digital signal;

means supplied with said extracted system clock reference values and extracted transmission rate values for generating estimated clock reference values between the times indicated by said extracted system clock reference values, said means for generating including means for adjusting the values of the extracted system clock reference values and the generated estimated clock reference values to be a value representative of the time that a corresponding cell was supplied as an output from a remote encoder and means for generating an estimated clock reference value for each received cell in the asynchronous digital signal between the times indicated by said extracted system clock reference values;

means for utilizing said extracted system clock reference values and estimated clock reference values for generating a system time clock at the receiver, said means for utilizing including means responsive to said system time clock, said extracted system clock reference values and said estimated clock reference values for generating an error signal representative of the difference between said system time clock and said estimated clock reference values; and means for determining when said extracted system clock reference values and extracted transmission rate values occur in the same received cell, said means for utilizing further including means for inhibiting generation of said error signal when said extracted system clock reference values and said extracted transmission rate values are not in the same cell.

7. The apparatus as defined in claim 6 further including means for detecting lost cells and wherein said means for adjusting adjusts the extracted system clock reference value or the estimated clock reference value corresponding to each lost cell by adding a cell interval to the corresponding adjusted clock reference value for the lost cell.

* * * * *